May 26, 1964   W. SIDENBENDER ETAL   3,134,569
QUICK CLOSING VALVE
Filed Feb. 19, 1962
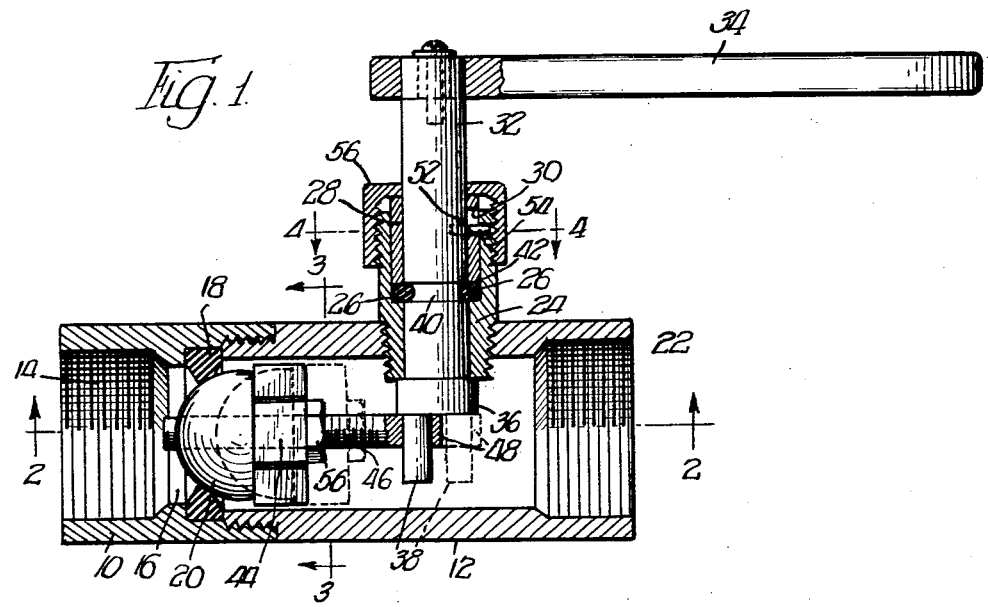
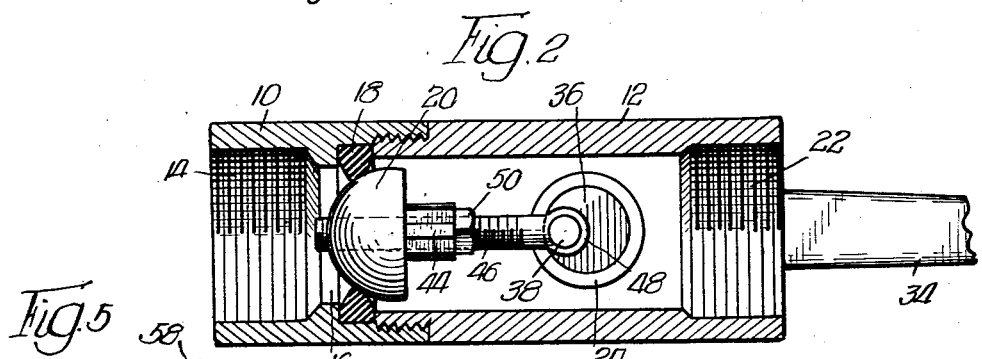
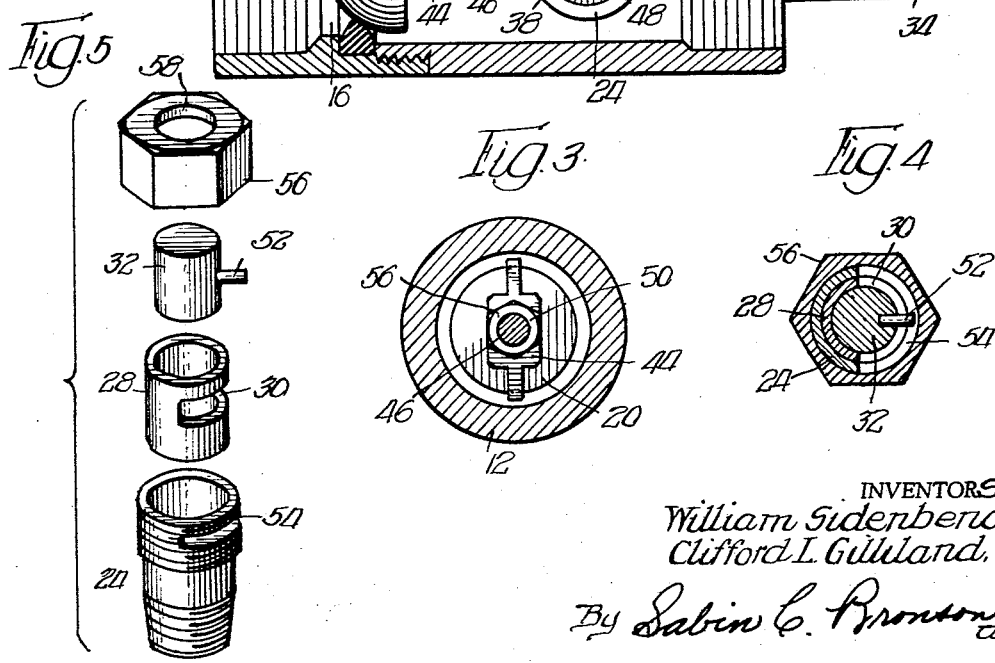
INVENTORS
William Sidenbender,
Clifford L. Gilliland,
By Sabin C. Bronson
Atty.

United States Patent Office 3,134,569
Patented May 26, 1964

3,134,569
QUICK CLOSING VALVE
William Sidenbender, 945 150th St., Hammond, Ind., and Clifford L. Gilliland, 8311 Kraay, Munster, Ind.
Filed Feb. 19, 1962, Ser. No. 173,968
2 Claims. (Cl. 251—214)

This invention relates to improvements in valves, and particularly to a quick opening and closing valve structure, which is of simple design, is positive in action, will maintain a fluid tight joint around the stem, is pressure sealed and is self cleaning.

An object of the invention is to provide a semi-ball type valve operating against a removable flexible seat which practically eliminates the grinding of valve seats or the replacing of worn seats when required.

Other objects and advantages of the invention will appear in the following description thereof.

Referring now to the accompanying drawing forming part of this application and wherein like reference characters indicate like parts.

FIGURE 1 is a cross sectional view through a valve body and stem showing in dotted lines the open position of the valve.

FIGURE 2 is a section on the line 2—2 of FIG. 1.
FIGURE 3 is a section on the line 3—3 of FIG. 1.
FIGURE 4 is a section on the line 4—4 of FIG. 1.
FIGURE 5 is an exploded view of the actuating stem mechanism.

In the drawings the valve body comprises a cylindrical housing formed of two parts 10 and 12. Part 10 is internally threaded as at 14 at its outer end and at the inner end of the threaded portion is provided with an annular shoulder 16 against which the resilient annular seat 18 abuts. The seat is of substantial thickness so that it can stand much abuse. It is formed of neoprene, or like tough resilient material, which forms an excellent seat for the hereinafter described ball valve 20. The inner end of part 10 of the housing is internally threaded to fit over the externally threaded end of part 12 of the housing portion and thus forms a continuous opening through parts 10 and 12. The other end of part 12 is also internally-threaded as at 22 so that the valve body may be applied into a fluid line, the flow in which it is desired to control by the valve.

A threaded opening is formed laterally through the wall of portion 12 of the valve body into which is screw-threadedly applied one end of a nipple-like portion 24. The other end of this nipple 24 is of larger internal diameter for about half its length, resulting in a shoulder 26 at its intersection with the smaller internal diameter of the nipple. Within the larger diametered portion is fitted a sleeve 28, which projetcs slightly above the upper edge of said nipple and is provided with a relatively wide horizontal slot 30, the width being in the axial direction of the sleeve. Within the sleeve 28 and smaller diameter of nipple 24 is fitted the operating stem 32 of the valve, at the outer end of which is mounted an operating handle 34 for rotating same in opening and closing the valve. At the bottom of the stem is a circular disc 36 which abuts against the lower end of nipple 24. Projecting from the lower face of the disc 36 is a crank pin 38 eccentrically mounted in said disc. The stem 32 is provided with a circumferential recess 40 within which is mounted an O-ring or circular packing 42 to provide a seal against passage of fluid along the wall of the stem.

The ball valve 20 is semi-cylindrical in form and has a guide portion 44 integrally formed therewith to keep the ball in substantial alignment with the seat. The ball and guide unit is provided with a threaded axial hole therethrough into which is screw-threadedly applied the activator rod 46, the inner end of which is provided with a crank bearing 48 mounted on the crank pin 38. Thus the ball and guide unit may be adjusted on the activator rod so that it will properly seat on seat 18 and close flow of fluid through the valve. When properly adjusted a lock nut 50 may be tightened to hold the parts in place until wear determines that the ball needs adjustment when such may be attended to.

A stop pin 52 projects from the wall of the operating stem 32 through the relatively wide horizontal slot 30 of sleeve 28 and into a relatively narrow horizontal slot 54 of nipple 24. Both of these slots 30 and 54 are coterminous and extend slightly more than half way around the circumference of the sleeve and nipple. This permits the sleeve 28 to move longitudinally on the stem 32 within the width of the relatively wide slot 30. It also permits the stem to be rotated until the stop pin contacts the end of slot 54 which is just past dead center of the pin and provides a positive lock in the closed position of the ball.

A stuffing nut or cap screw 56 having an axial opening 58 therethrough of a diameter to snugly fit the stem 32 is applied over said stem and screwed onto the upper threaded portion of the nipple 24. The nut 56 bears against the upper edge of the sleeve 28 and by forcing down on the nut the sleeve may be forced down upon the O-ring 42 when necessary to form a tighter joint. This will only be necessary when the fluid in the line is at elevated pressures of about 750 p.s.i. or above.

From the foregoing it is believed evident how the valve operates. As shown in the drawings, when the handle 34 is rotated one way or the other, it causes like rotation of the stem 32 which causes the crank pin 38 to revolve about the axis of stem 32 which will move the ball valve 20 away from its seat 18. As the fluid flow is in the direction of the arrow in FIG. 2, it will be seen that the valve opens against the fluid flow and closes with the fluid flow. Pressure is always on the esat 18 to maintain it in position within the valve when the ball is not on the seat. When a better seal is desired around the stem, nut 56 may be tightened a turn or two which will force the bottom edge of the sleeve down onto the O-ring, further compressing same and accomplishing a better seal.

Having thus described our invention, what we claim and desire to secure by Letters Patent is:

1. A valve comprising a valve body of first and second interconnected members having aligned passages, an annular transverse valve seat held within said passage by engagement between said members, a valve longitudinally reciprocable in said passage and engageable and disengageable with said seat in opening or closing said valve, a lateral opening through the wall of said valve body into said passage, a nipple in said opening having a shoulder therein, a sleeve in said nipple, a valve stem projecting through said sleeve and nipple into said passage, an annular recess about said valve stem adjacent the bottom edge of said sleeve, an O-ring in said recess engaging the wall of the nipple and shoulder, a cap screw threadedly mounted on the upper margin of said nipple and engaging the upper edge of said sleeve, whereby tightening of said cap screw will force said sleeve against said O-ring and form a tighter seal, and eccentric means connecting said stem and valve whereby rotation of said valve stem will cause reciprocation of said valve to open and close the valve.

2. A valve comprising a valve body of first and second interconnected members having aligned passages, an annular transverse valve seat held within said passage by engagement between said members, a valve longitudinally reciprocable in said passage and engageable and disengageable with said seat in opening or closing said valve, a lateral opening through the wall of said valve body into said passage, a nipple in said opening, a sleeve in said nipple, said nipple and sleeve each having circumferential registering coterminous slots therein, the slot in the sleeve being wider in the axial direction of the sleeve than the slot in the nipple, a valve stem projecting through said sleeve and nipple into said passage, a stop pin projecting from said valve stem through said registering slots, said valve stem having a circumferential recess thereabout, an O-ring within said recess, means screw-threadedly mounted on the upper margin of said nipple and engaging the upper edge of said sleeve, whereby tightening of said means will force said sleeve against said O-ring and form a tighter seal on said stem, and eccentric means connecting said stem and valve whereby rotation of said valve stem will cause reciprocation of said valve to open and close the valve.

References Cited in the file of this patent

UNITED STATES PATENTS

| 280,137 | Cooper | June 26, 1883 |
| 2,408,006 | Smith | Sept. 24, 1946 |
| 2,662,721 | Giauque | Dec. 15, 1953 |
| 2,912,217 | Freeman et al. | Nov. 10, 1959 |
| 2,994,341 | Leopold et al. | Aug. 1, 1961 |

FOREIGN PATENTS

| 186,112 | Great Britain | Sept. 13, 1922 |
| 814,625 | France | Mar. 22, 1937 |
| 915,680 | Germany | July 26, 1954 |